(12) United States Patent
Yang et al.

(10) Patent No.: US 10,728,449 B2
(45) Date of Patent: Jul. 28, 2020

(54) ELECTRONIC DEVICE AND OPERATION METHOD THEREOF

(71) Applicant: Acer Incorporated, New Taipei (TW)

(72) Inventors: Yi-Hsuan Yang, New Taipei (TW);
Cheng-Mao Chang, New Taipei (TW);
Chia-Bo Chen, New Taipei (TW);
Li-Hua Hu, New Taipei (TW);
Pao-Min Huang, New Taipei (TW);
Yan-Fong Cheng, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 9 days.

(21) Appl. No.: 15/920,942

(22) Filed: Mar. 14, 2018

(65) Prior Publication Data
US 2019/0149729 A1 May 16, 2019

(30) Foreign Application Priority Data

Nov. 13, 2017 (TW) .............................. 106139135 A

(51) Int. Cl.
*H04N 7/01* (2006.01)
*H04N 5/232* (2006.01)
(Continued)

(52) U.S. Cl.
CPC ....... *H04N 5/23238* (2013.01); *H04N 5/2251* (2013.01); *H04N 5/23296* (2013.01);
(Continued)

(58) Field of Classification Search
None
See application file for complete search history.

(56) References Cited

U.S. PATENT DOCUMENTS

2017/0235355 A1* 8/2017 Alshinnawi ........... G06F 1/3206
713/323
2018/0129112 A1* 5/2018 Osterhout ............... G02F 1/153
(Continued)

FOREIGN PATENT DOCUMENTS

| CN | 105162961 A | 12/2015 |
|---|---|---|
| CN | 205725913 U | 11/2016 |

(Continued)

OTHER PUBLICATIONS

Pefhany, "Choosing a Relay to Operate Solenoid Valve" Electrical Engineering Stack Exchange (Apr. 6, 2017). (Year: 2017).*
(Continued)

*Primary Examiner* — Shadan E Haghani
(74) *Attorney, Agent, or Firm* — McClure, Qualey & Rodack, LLP

(57) ABSTRACT

The present disclosure provides an electronic device that includes a display device. A first panoramic image capturing device is movably configured on the display surface of the display device. A second panoramic image capturing device is movably configured on a back panel relative to the display surface. A drive unit is configured to push the first panoramic image capturing device out of the electronic device along a first direction perpendicular to the display surface and push the second panoramic image capturing device out of the electronic device along a second direction, which is opposite to the first direction, when receiving a first signal. The drive unit is configured to pull the first panoramic image capturing device back to the electronic device along the second direction and pull the second panoramic image capturing device back to the electronic device along the first direction when receiving a second signal.

6 Claims, 9 Drawing Sheets

(51) Int. Cl.
*H04N 7/14* (2006.01)
*H04N 7/18* (2006.01)
*H04N 5/225* (2006.01)

(52) U.S. Cl.
CPC ............... *H04N 7/142* (2013.01); *H04N 7/18* (2013.01); *H04N 2007/145* (2013.01)

(56) References Cited

U.S. PATENT DOCUMENTS

2018/0361998 A1* 12/2018 Renaud ................ H04N 5/2252
2019/0014247 A1* 1/2019 Brand .................... H04N 5/232

FOREIGN PATENT DOCUMENTS

TW          201611599 A     3/2016
TW            1594107 B     8/2017

OTHER PUBLICATIONS

Chinese language office action dated Jul. 9, 2018, issued in application No. TW 106139135.

* cited by examiner

ELECTRONIC DEVICE AND OPERATION METHOD THEREOF

CROSS REFERENCE TO RELATED APPLICATIONS

This Application claims priority of Taiwan Patent Application No. 106139135, filed on Nov. 13, 2017, the entirety of which is incorporated by reference herein.

BACKGROUND OF THE DISCLOSURE

Field of the Invention

The present disclosure relates to an electronic device, and, in particular, to the electronic device having one or more panoramic image capturing devices.

Description of the Related Art

Laptops, tablet computers, and smartphones are normally equipped with image capturing devices that allow the user to capture images, shoot video, and engage in video chats. However, these image capturing devices are not the panoramic type, and they cannot capture panoramic images. In some situations, when the object to be photographed is not inside the viewing area of the lens, the user needs to move the electronic device or the lens to include the object within the viewing area of the lens. This causes inconvenience to the user.

Furthermore, in some situations, such as video conferencing, the normal image capturing device cannot capture all the people at the same time, and it is difficult for the user to watch and talk to all the people.

BRIEF SUMMARY OF THE INVENTION

The present disclosure provides an electronic device that includes a display device, a first panoramic image capturing device, a second panoramic image capturing device, and a drive unit. The first panoramic image capturing device is movably configured on the display surface of the display device. The second panoramic image capturing device is movably configured on the back panel relative to the display surface. The drive unit is configured to push the first panoramic image capturing device out of the electronic device along a first direction perpendicular to the display surface, and to push the second panoramic image capturing device out of the electronic device along a second direction, which is opposite to the first direction, when the drive unit receives a first signal. The drive unit is configured to pull the first panoramic image capturing device back to the electronic device along the second direction, and to pull the second panoramic image capturing device back to the electronic device along the first direction when the drive unit receives a second signal.

The present disclosure provides another electronic device which includes a display device, a sensing unit, a panoramic image capturing device, and a drive unit. The sensing unit is configured to sense the angle and/or the distance of the display device relative to a reference plane. The sensing unit produces a first signal when the angle and/or distance match a predetermined condition. The sensing unit produces a second signal when the angle and/or distance do not match the predetermined condition. The panoramic image capturing device is movably configured on the display device or a back panel relative to the display device. The drive unit is configured to push the panoramic image capturing device out of the electronic device along a first direction when the drive unit receives the first signal, and to pull the panoramic image capturing device back to the electronic device along a second direction opposite to the first direction when the drive unit receives the second signal.

The present disclosure also provides a method of operating an electronic device, which includes sensing the angle and/or distance of the display device relative to a reference plane; and pushing at least one panoramic image capturing device out of the electronic device along a first direction when the angle and/or distance is over a predetermined range and pulling the panoramic image capturing device back to the electronic device along a second direction opposite to the first direction when the angle and/or distance is within the predetermined range.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only exemplary aspects of the disclosure and are not therefore to be considered to be limiting of its scope, the principles herein are described and explained with additional specificity and detail through the use of the accompanying drawings.

DETAILED DESCRIPTION OF THE INVENTION

Figure 1A:
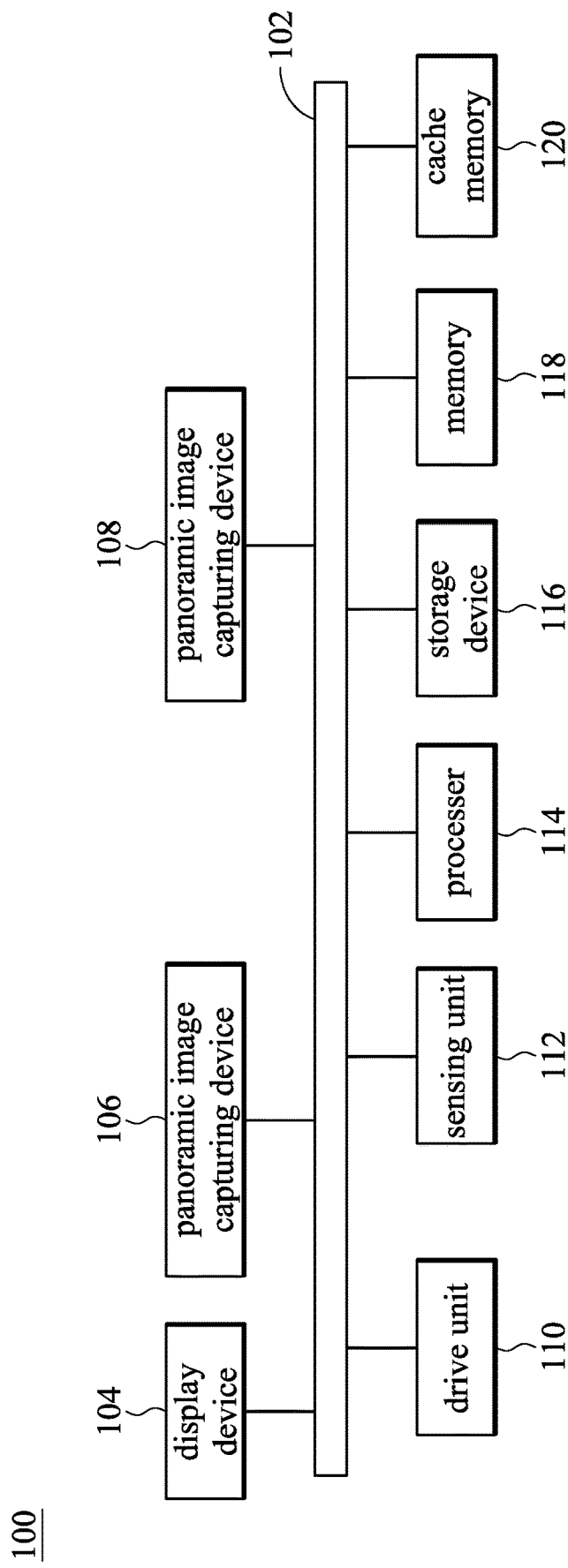
FIG. 1a illustrates an electronic device having the panoramic image capturing devices in accordance with some embodiments of the present disclosure.

FIG. 1a shows an electronic device 100 having panoramic image capturing devices, in accordance with some embodiments of the present disclosure. The components of the electronic device 100 electrically communicate with each other using a bus 102. The electronic device 100 includes a display device 104, panoramic image capturing devices 106 and 108, a drive unit 110, a sensing unit 112, a processor 114, a storage device 116, a memory 118 and a cache memory 120.

The electronic device 100 can copy data from the memory 118 and/or the storage device 116 to the cache memory 120 for quick access by the processor 114. In this way, the cache memory 120 can provide a performance boost to avoid delays when the processor 114 waits for data. The memory 118 can include many memories of different types and with different performance characteristics. The processor 114 can include any general purpose processor, and a module (e.g., hardware module or software module) stored in storage device 116, which is configured to control the processor 114 as well as a special-purpose processor where software instructions are incorporated into the actual processor design. The processor 114 may essentially be a completely self-contained computing system, and contain multiple cores or processors, a bus, memory controller, cache, etc.

The storage device 116 is a non-volatile memory and can be a hard disk or another type of computer readable media. The media can store data that are accessible by a computer, such as magnetic cassettes, flash memory cards, solid state memory devices, digital versatile disks, cartridges, random access memories (RAMs), read only memory (ROM), and hybrids thereof. In some embodiments, the storage device 116 may include software modules performed by the processor 114.

The panoramic image capturing devices 106 and 108 are coupled to other components of the electronic device 100 by the bus 102, such as the processor 114 and the drive unit 110. The panoramic image capturing devices 106 and 108 are configured to capture image, shoot video, and make video chat and to input the captured images into the processor 114 for subsequent processes. For example, the processor 114 combines the captured images into a panoramic image, and is not intended to limit the present disclosure. In some embodiments, the panoramic image capturing devices 106 is movably configured on a display surface of the display device 104 and the panoramic image capturing devices 108 is movably configured on a back panel relative to the display surface of the display device 104.

The drive unit 110 is coupled to the sensing unit 112, the panoramic image capturing devices 106 and 108 through the bus 102. The drive unit 110 is configured to selectively push the panoramic image capturing devices 106 and/or the panoramic image capturing devices 108 out of the electronic device 100, and to pull the panoramic image capturing devices 106 and/or the panoramic image capturing devices 108 back to the electronic device 100 according to the signal from the sensing unit 112. In some embodiments, the drive unit 110 can be solenoid valve, voice coil motor, spirally telescoping device, or another suitable device. For example, the drive unit 110 pushes the panoramic image capturing devices 106 and 108 out of the electronic device 100 when receiving a first signal, and the drive unit 110 pulls the panoramic image capturing devices 106 and 108 back to the electronic device 100 when receiving a second signal.

Figure 1B:
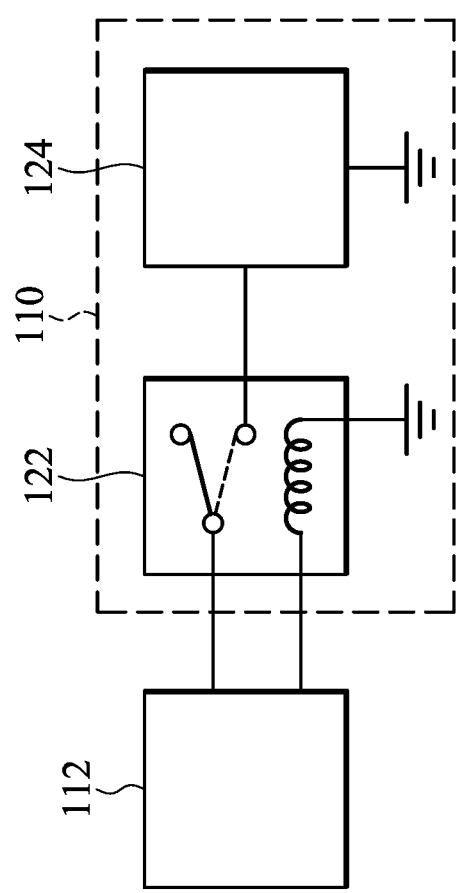
FIG. 1b illustrates a drive unit including a relay and a motion component in accordance with some embodiments of the present disclosure.

In some embodiments, the drive unit 110 includes a relay 122 and a motion component 124, as shown in FIG. 1*b*. The relay 122 can receive the first signal from the sensing unit 112 to produce a pushing signal. The pushing signal drives the motion component 124 (e.g., solenoid valve, voice coil motor) to push the panoramic image capturing devices 106 and 108 out of the electronic device 100. The relay 122 also receives the second signal from the sensing unit 112 to produce a pulling back signal. The pulling back signal drives the motion component 124 to pull the panoramic image capturing devices 106 and 108 back to the electronic device 100.

The sensing unit 112 is coupled to the drive unit 110 by the bus 102 and is configured to sense the location of the display device 104 relative to a reference plane. In some embodiments, the sensing unit 112 can be a distance sensor, angle sensor, Hall Effect sensor, or another suitable sensor. The sensing unit 112 produces and outputs the first signal to the drive unit 110 to make the drive unit 110 push the panoramic image capturing devices 106 and 108 out of the electronic device 100 when the location sensed by the sensing unit 112 matches a predetermined condition in the electronic device 100. The sensing unit 112 produces and outputs the second signal to the drive unit 110 to make the drive unit 110 pull the panoramic image capturing devices 106 and 108 back to the electronic device 100 when the location sensed by the sensing unit 112 does not match the predetermined condition in the electronic device 100. In some embodiments, the location sensed by the sensing unit 112 is the location of the display device 104 relative to the reference plane. In some embodiments, matching the predetermined condition is that the location (the sensed distance and/or angle) is over a predetermined range, and is not intended to limit the present disclosure.

Figure 2:
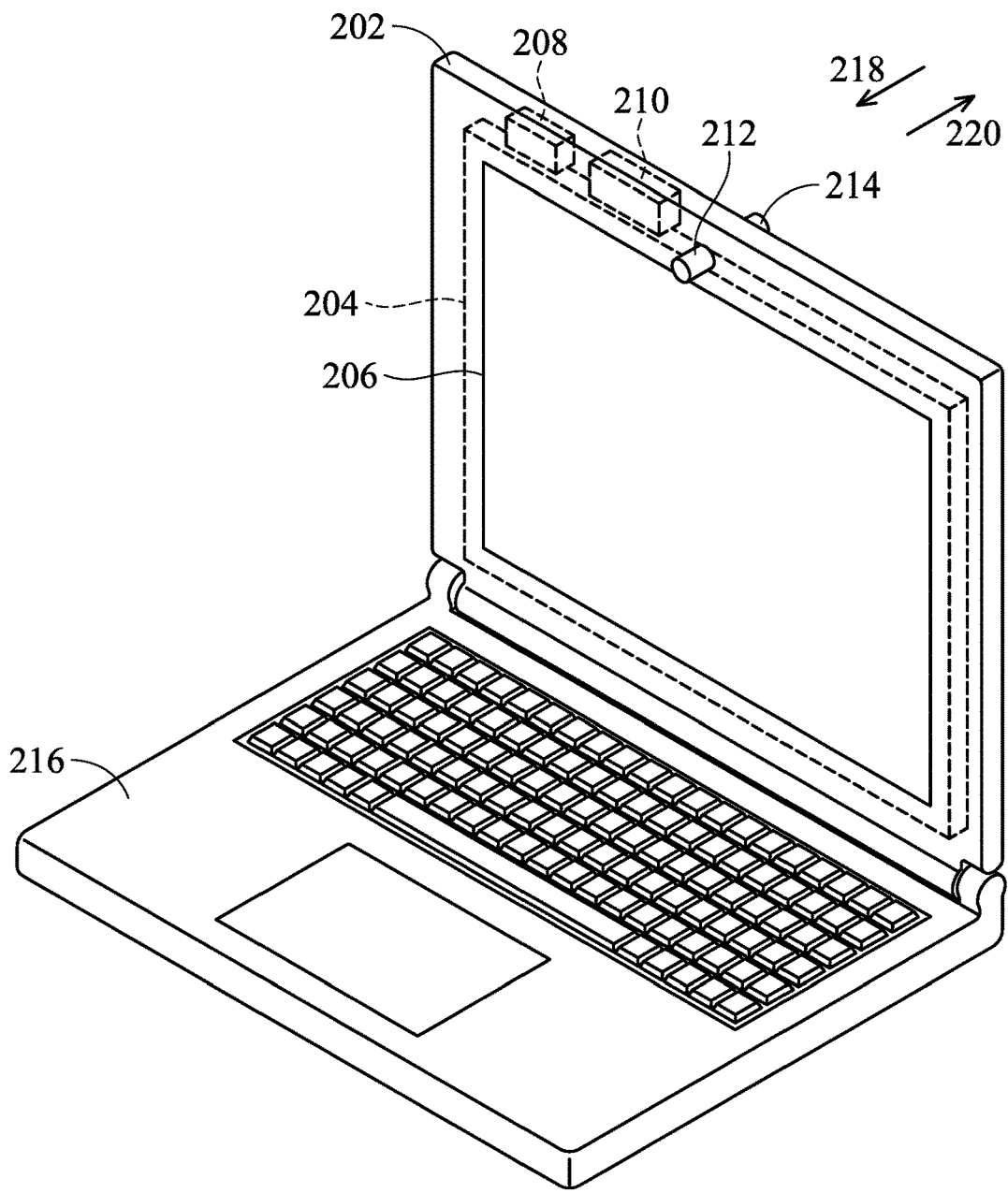
FIG. 2 illustrates an electronic device having the panoramic image capturing devices in accordance with some embodiments of the present disclosure.

FIG. 2 shows the electronic device 200 having the panoramic image capturing devices, in accordance with some embodiments of the present disclosure. It should be understood that other configurations and inclusion or omission of various items in the electronic device 200 may be possible. The electronic device 200 is exemplary, and is not intended to limit the disclosure beyond what is explicitly recited in the claims. As shown in FIG. 2, in the present embodiment, the electronic device 200 is a laptop. The electronic device 200 includes a cover 202 of the display device 204, a display screen 206, a sensing unit 208, a drive unit 210, panoramic image capturing devices 212 and 214, and a base 216.

The panoramic image capturing device 212 is movably configured on a plane on which the display screen 206 of the display device 204 is arranged. The lens of the panoramic image capturing device 212 faces to the user and the panoramic image capturing device 212 can move perpendicularly with respect to the plane. For example, the panoramic image capturing device 212 is pushed out of the electronic device 200 along a direction 218 perpendicular to the plane on which the display screen 206 is arranged, and is pulled back to the electronic device 200 along a direction 220 opposite to the direction 218. The panoramic image capturing device 214 is movably configured on a back panel relative to the display screen 206. The lens of the panoramic image capturing device 214 backs to the user and the panoramic image capturing device 214 can move perpendicularly with respect to the back panel. For example, the panoramic image capturing device 214 is pushed out of the electronic device 200 along the direction 220 and is pulled back to the electronic device 200 along the direction 218. It should be understood that the location of the panoramic image capturing devices 212 and 214 is exemplary, and is not intended to limit the present disclosure.

Figure 3A:
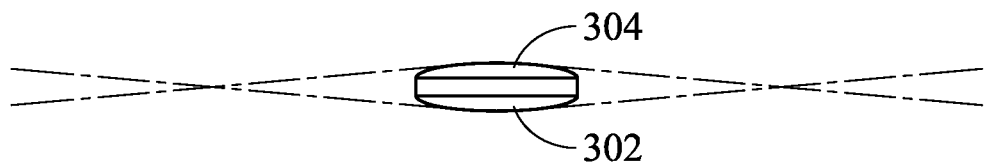
FIGS. 3a, 3b, 3c, and 3d show the normal panoramic camera, the electronic device configured with the panoramic image capturing devices, and the panoramic image capturing devices pushed out and pulled back, in accordance with some embodiments of the present disclosure.
Figure 3B:
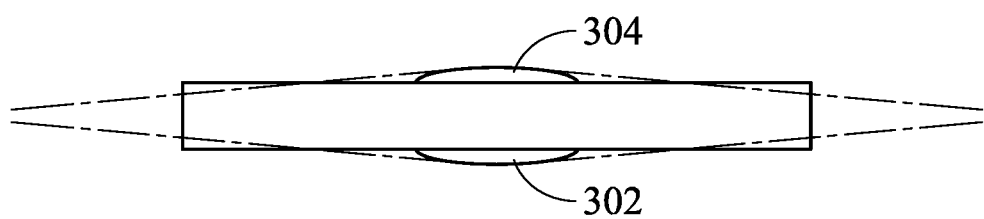

In normal panoramic camera, the electronic device will not limit the viewing angle of the lens. FIG. 3*a* shows a normal panoramic camera, wherein the viewing angle (shown with dash line) of the panoramic image capturing devices 302 and 304 are not limited by the electronic device. Therefore, the images captured by the panoramic image capturing devices 302 and 304 overlap and can be combined into the panoramic image. However, when the panoramic image capturing devices are configured on a larger electronic device, such as laptop, the electronic device will limit the viewing angle of the lens. As shown in FIG. 3b, when the panoramic image capturing devices 302 and 304 are arranged on the larger electronic device, the viewing angle of the panoramic image capturing devices 302 and 304 are limited by the electronic device and thus the images captured by the panoramic image capturing devices 302 and 304 do not overlap. When the images are merged or combined, the panoramic image has an area blocked by the electronic device. Therefore, the panoramic image capturing device needs to be movable, and then the panoramic image capturing device can be pushed to avoid limiting the viewing angle of the lens caused by the electronic device when shooting panoramic video. For example, the panoramic image capturing devices 212 and 214 of the electronic device 200 are pushed out to shoot panoramic video in FIG. 2.

Figure 3C:
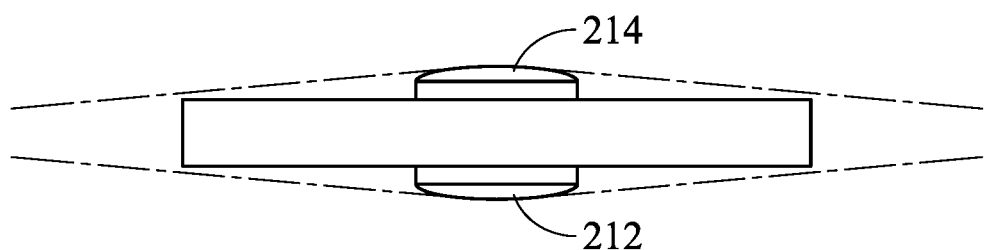

FIG. 3c shows that the panoramic image capturing devices 212 and 214 are pushed out. The viewing angle of the panoramic image capturing devices 212 and 214 are not limited by the electronic device, the panoramic image does not have an area blocked by the electronic device when shooting images and combining images into a panoramic image.

Figure 3D:
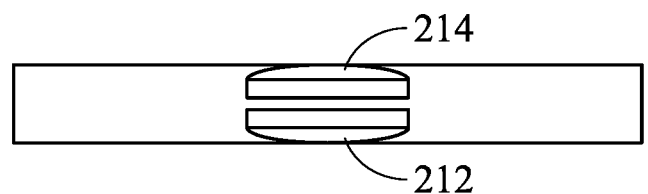

In the present embodiment, the panoramic image capturing devices can be pulled back to the electronic device to avoid damage. For example, when the cover 202 of the electronic device 200 is closed, the panoramic image capturing devices 212 and 214 are pulled back into the cover 202 to avoid collision with external object (such as base 216), as shown in FIG. 3d.

When the drive unit 210 receives the first signal, the panoramic image capturing device 212 is pushed out of the electronic device 200 along the direction 218 and the panoramic image capturing device 214 is pushed out of the electronic device 200 along the direction 220. On the other hand, when the drive unit 210 receives the second signal, the panoramic image capturing device 212 is pulled back to the electronic device 200 along the direction 220 and the panoramic image capturing device 214 is pulled back to the electronic device 200 along the direction 218.

The following will describe in detail the drive unit 210 which may be a solenoid valve, a voice coil motor, or a spirally telescoping device.

Figure 4A:
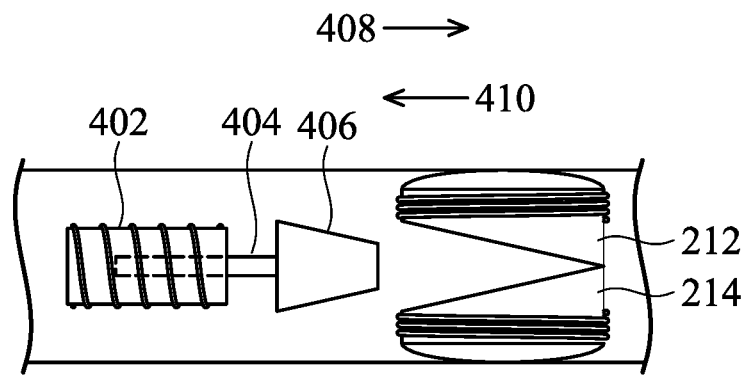
FIGS. 4a, 4b, and 4c illustrate the drive unit in accordance with some embodiments of the present disclosure.

FIG. 4a schematically shows a drive unit, in accordance with some embodiments of the present disclosure. In the present embodiment, the drive unit 210 includes a solenoid valve 402 arranged in the electronic device 200 (e.g. the cover 202 of the electronic device 200). The solenoid valve 402 includes a pushing rod 404, wherein the pushing rod 404 has a wedge structure 406 on its front position. The panoramic image capturing devices 212 and 214 have a corresponding structure which can be inserted by the wedge structure 406. When the solenoid valve 402 pushes out the pushing rod 404 along a direction 408 parallel to the plane where the display screen 206 (not shown in FIG. 4a) is arranged according to the pushing signal, the wedge structure 406 inserts between the panoramic image capturing devices 212 and 214 to push them out of the electronic device 200. When the solenoid valve 402 pulls back the pushing rod 404 along a direction 410 opposite to the direction 408 according to the pulling back signal, the panoramic image capturing devices 212 and 214 are pulled back to the electronic device 200 by the recovery unit (such as spring, not shown in FIG. 4a).

Figure 4B:
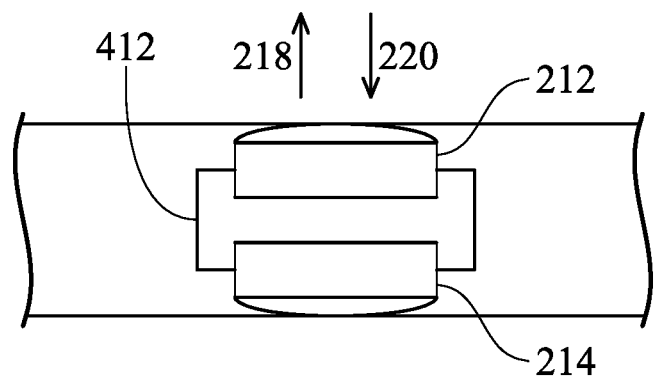

FIG. 4b shows another drive unit, in accordance with some embodiments of the present disclosure. The drive unit 210 includes a voice coil motor 412 configured in the electronic device 200 and connected to the panoramic image capturing devices 212 and 214. When the voice coil motor 412 receives the first signal from the sensing unit 208, the panoramic image capturing devices 212 and 214 are directly pushed out of the electronic device 200 along the direction 218 and 220, respectively. When the voice coil motor 412 receives the second signal from the sensing unit 208, the panoramic image capturing devices 212 and 214 are directly pulled back to the electronic device 200 along the direction 220 and 218, respectively.

Figure 4C:
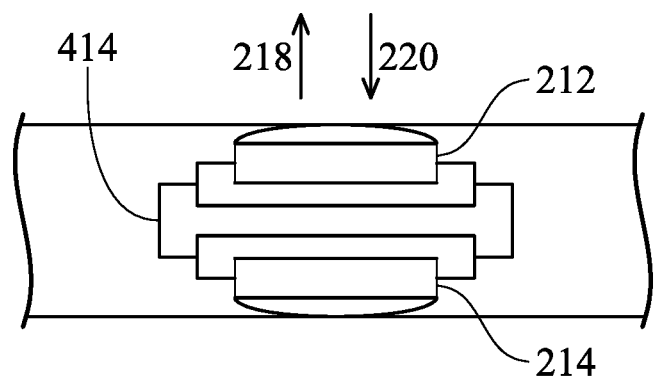

FIG. 4c shows another drive unit, in accordance with some embodiments of the present disclosure. The drive unit 210 includes a spirally telescoping device 414 arranged in the electronic device 200 and connected to the panoramic image capturing devices 212 and 214. When the spirally telescoping device 414 receives the first signal from the sensing unit 208, the panoramic image capturing devices 212 and 214 are pushed out of the electronic device 200 along the direction 218 and 220, respectively. When the spirally telescoping device 414 receives the second signal came from the sensing unit 208, the panoramic image capturing devices 212 and 214 are pulled back to the electronic device 200 along the direction 220 and 218, respectively.

In the present embodiment, the sensing unit 208 is configured to sense the location of the display device 204 relative to a reference plane. It should be understood that the location of the sensing unit 208 is exemplary, and is not intended to limit the present disclosure. In the present embodiment, the sensing unit 208 is an angle sensor, such as a Hall Effect sensor, a G-sensor, or another suitable sensor which can measure the angle. The reference plane is the surface of the base 216 and the location is the opening angle of the display device 204 relative to the base 216. In some embodiments, the location is the opening angle of the cover 202 relative to the base 216.

Figure 5A:
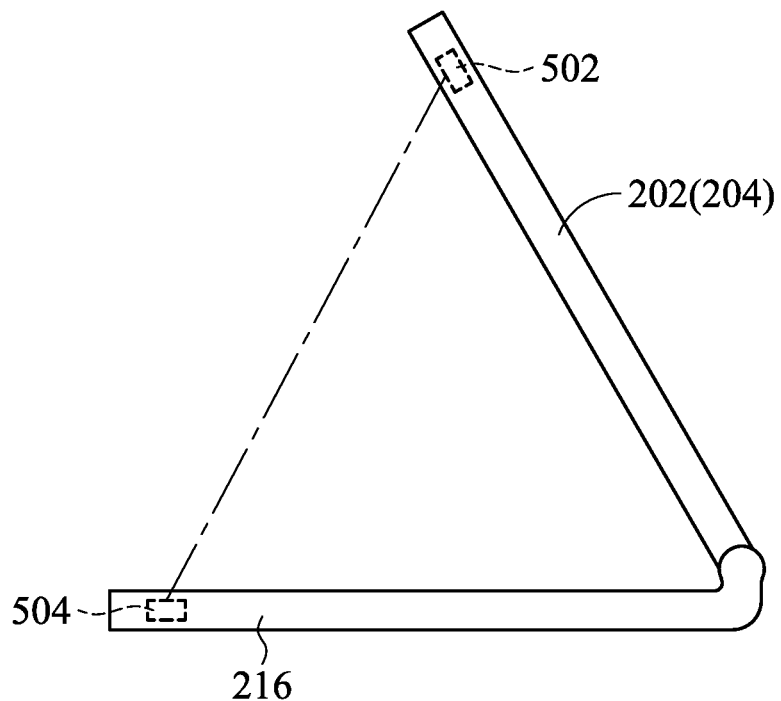
FIGS. 5a and 5b show the electronic device sensing the opening angle in accordance with some embodiments of the present disclosure.
Figure 5B:
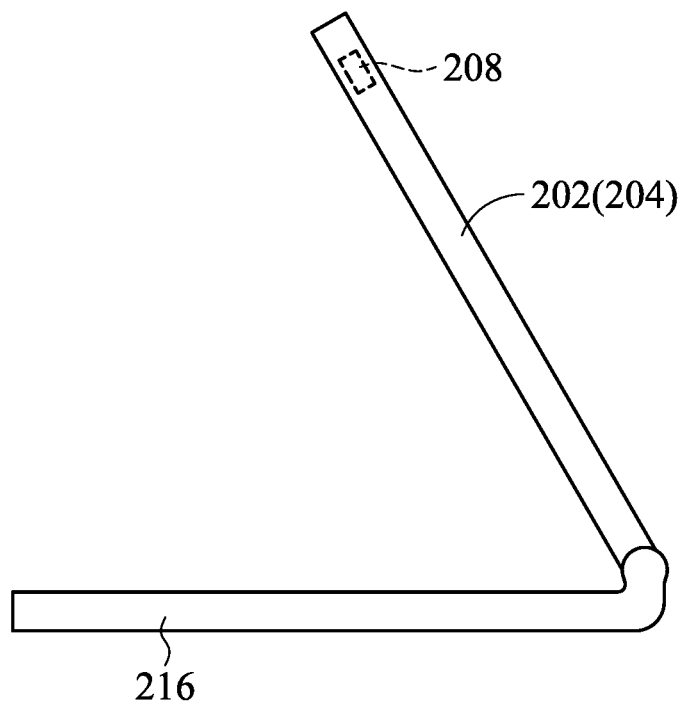

In one embodiment, the sensing unit 208 includes a Hall Effect sensor 502 and a magnet 504, as shown in FIG. 5a. One of the Hall Effect sensor 502 and the magnet 504 is arranged in the cover 202 or the display device 204 and the other is arranged in the base 216. The opening angle of the cover 202 and the base 216, or the display device 204 and the base 216 is sensed by the relative position (or the distance) of the Hall Effect sensor 502 and the magnet 504. For example, when the distance between the Hall Effect sensor 502 and the magnet 504 is higher than a predetermined value, the intensity of the magnetic field sensed by the Hall Effect sensor 502 is lower than a threshold value, it means that the opening angle of the cover 202 and the base 216 is larger than a predetermined range, therefore the Hall Effect sensor 502 produces the first signal. On the other hand, when the distance between the Hall Effect sensor 502 and the magnet 504 is lower than the predetermined value, the intensity of the magnetic field sensed by Hall Effect sensor 502 is not lower than the threshold value, it means that the opening angle of the cover 202 and the base 216 is smaller than a predetermined range, therefore the Hall Effect sensor 502 produces the second signal. In another embodiment, the sensing unit 208 is a G-sensor configured in the electronic device that directly senses the opening angle of the cover 202 and base 216, as shown in FIG. 5b.

In the present embodiment, the predetermined range of the opening angle of the cover 202 and the base 216 is from 30° to 70° to give the panoramic image capturing devices 212 and 214 enough time to be pushed out or pulled back. In the present embodiment, the operation flow of the electronic device 200 is that the sensing unit 208 senses the opening angle of the cover 202 or the display device 104 relative to the base 216 when the user opens the cover 202 of the electronic device 200. If the opening angle matches the predetermined condition (the opening angle is over a predetermined range), the sensing unit 208 produces the first signal to the drive unit 210 to push the panoramic image capturing device 212 out of the electronic device 200 along the direction 218 and to push the panoramic image capturing device 214 out of the electronic device 200 along the direction 220. If the opening angle does not match the predetermined condition (the opening angle is within the predetermined range), the sensing unit 208 produces the second signal to the drive unit 210 to pull the panoramic image capturing device 212 back to the electronic device 200 along the direction 220 and to pull the panoramic image capturing device 214 back to the electronic device 200 along the direction 218.

Figure 6:
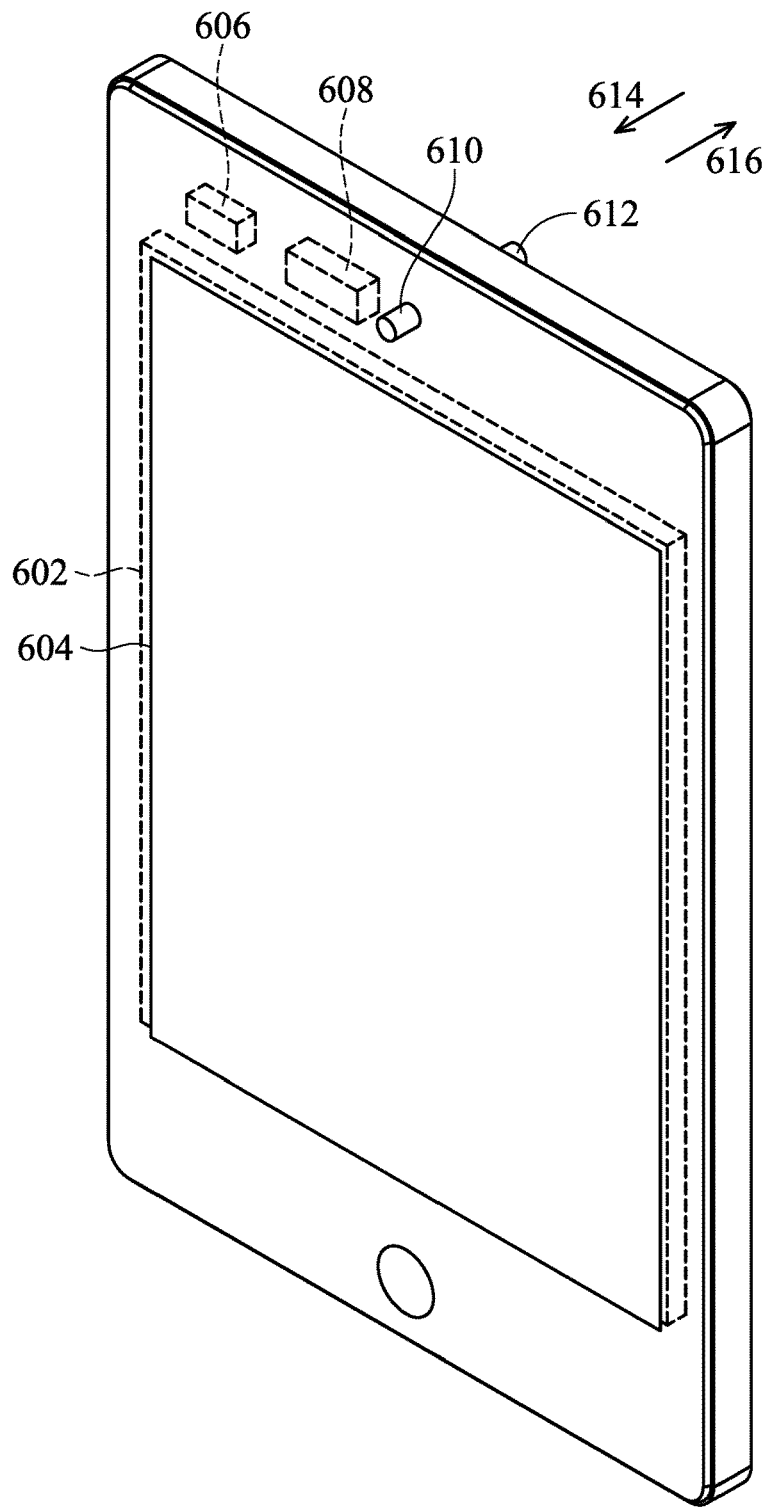
FIG. 6 illustrates an electronic device having the panoramic image capturing devices in accordance with some embodiments of the present disclosure.

FIG. 6 shows the electronic device 600 having the panoramic image capturing devices, in accordance with some embodiments of the present disclosure. It should be understood that other configurations and inclusion or omission of various items in the electronic device 600 may be possible. The electronic device 600 is exemplary, and is not intended to limit the disclosure beyond what is explicitly recited in the claims. As shown in FIG. 6, in the present embodiment, the electronic device 600 is a smartphone or a tablet. The electronic device 600 includes a display device 602, a display screen 604, a sensing unit 606, a drive unit 608, panoramic image capturing devices 610 and 612.

The panoramic image capturing device 610 is movably configured on a plane on which the display screen 604 of the display device 602 is arranged. The lens of the panoramic image capturing device 610 faces the user and the panoramic image capturing device 610 can move perpendicularly with respect to the plane. The panoramic image capturing device 612 is movably configured on a back panel relative to the display screen 604. The lens of the panoramic image capturing device 612 turns its back on the user and the panoramic image capturing device 612 can move perpendicularly with respect to the back panel.

When the drive unit 608 receives a first signal, the panoramic image capturing device 610 is pushed out of the electronic device 600 along a direction 614 perpendicular to the plane where the display screen 604 is arranged and the panoramic image capturing device 612 is pushed out of the electronic device 600 along a direction 616 opposite to the direction 614. When the drive unit 608 receives a second signal, the panoramic image capturing device 610 is pulled back to the electronic device 600 along the direction 616 and the panoramic image capturing device 612 is pulled back to the electronic device 600 along the direction 614.

The sensing unit 606 is configured to sense the location of the display device 602 relative to a reference plane. It should be understood that the location of the sensing unit 606 is exemplary, and is not intended to limit the present disclosure. In the present embodiment, the sensing unit 606 is a distance sensor, such as an infrared sensor, or another suitable sensor which can measure the distance. The reference plane is the surface of an external object, such as the desk surface.

When the sensing unit 606 senses that the distance between the surface of an external object and the display device 602 is over a predetermined range, the sensing unit 606 produces a first signal, and when the distance is within the predetermined range, the sensing unit 606 produces a second signal. It should be understood that the location of the surface of the external object relative to the display device 602 includes the front and back of the display device 602. In the present embodiment, the predetermined range is a distance range, such as 10 cm or another suitable distance, to give the panoramic image capturing device 610 and 612 enough time to be pushed out or pulled back.

In the present embodiment, the operation flow of the electronic device 600 is that the sensing unit 606 senses the distance of the display device 602 relative to the surface of the external object. If the distance between the surface of the external object and the display device 602 is over a predetermined range, the sensing unit 606 produces the first signal to the drive unit 608 to push the panoramic image capturing device 610 out of the electronic device 600 along the direction 614 and to push the panoramic image capturing device 612 out of the electronic device 600 along the direction 616. If the distance between the surface of an external object and the display device 602 is within a predetermined range, the sensing unit 606 produces the second signal to the drive unit 608 to pull the panoramic image capturing device 610 back to the electronic device 600 along the direction 616 and to pull the panoramic image capturing device 612 back to the electronic device 600 along the direction 614.

In various embodiments, the first signal and the second signal may not be produced by the sensing unit. In this situation, the first signal and the second signal are produced via the user by performing the function, software, and application in the electronic device. For example, when the user perform the software related to image capturing in the electronic device to panoramically capture image, shoot video, and make video chat, the electronic device produces the first signal. When the user closes the software related to image capturing in the electronic device, the electronic device produces the second signal. In these embodiments, the sensing unit does not perform any operations or the sensing unit is not configured in the electronic device.

Figure 7:
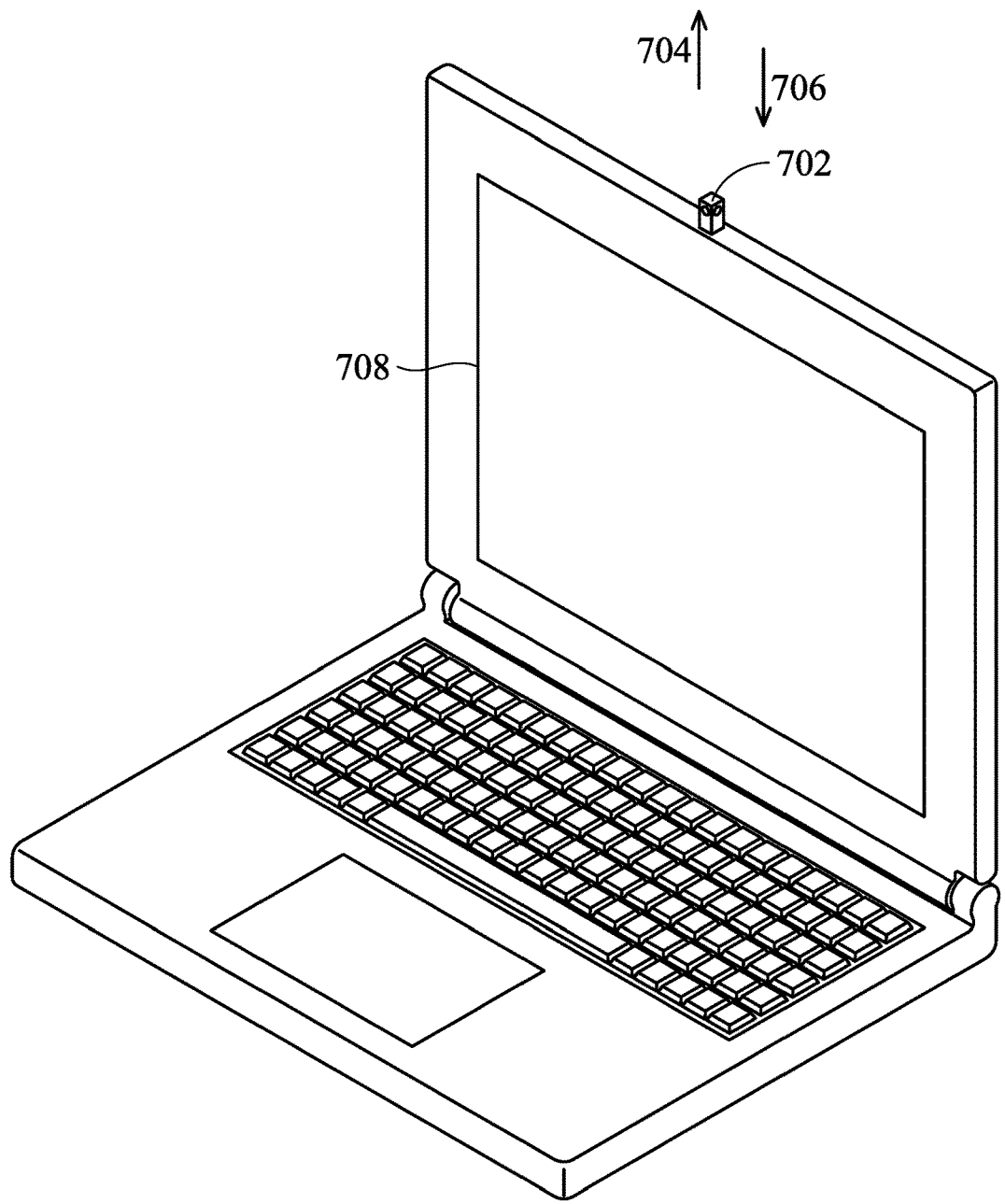
FIG. 7 illustrates an electronic device having the panoramic image capturing devices in accordance with some embodiments of the present disclosure.

FIG. 7 shows the electronic device 700 having the panoramic image capturing devices, in accordance with some embodiments of the present disclosure. In the present embodiment, the electronic device 700 also includes the sensing unit and the drive unit (not shown in FIG. 7), but merely includes a panoramic image capturing device 702.

The panoramic image capturing device 702 is movably configured in the electronic device 700 and is parallel to the short axis of the display screen (e.g., short axis 708). The panoramic image capturing device 702 is also movable parallel to the short axis of the display screen. The panoramic image capturing device 702 has at least two lenses to capture images and combine the captured images into panoramic image.

The operations of the electronic device 700 are similar to the operations of the electronic device 200 in FIG. 2 and the electronic device 600 in FIG. 6. The sensing unit can sense the location of a display device relative to a reference plane. If the location matches the predetermined condition in the electronic device 700, the sensing unit produces a first signal to the drive unit to make the drive unit push the panoramic image capturing device 702 out of the electronic device 700 along a direction 704 parallel to a plane on which the display screen is arranged. If the location does not match the predetermined condition in the electronic device 700, the sensing unit produces a second signal to the drive unit to make the drive unit pull the panoramic image capturing device 702 back to the electronic device 700 along a direction 706 opposite to the direction 704.

Figure 8:
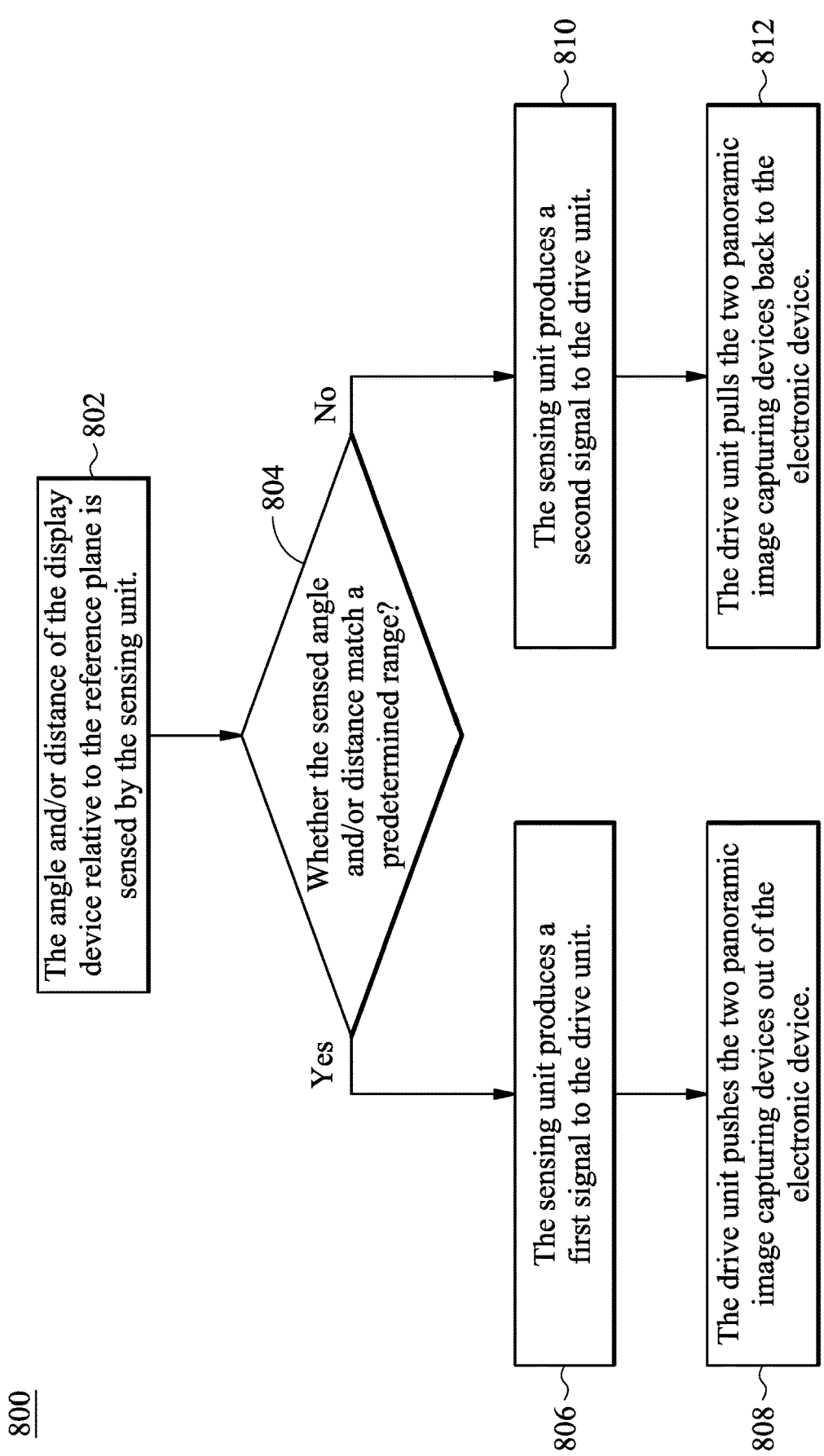
FIG. 8 shows the method of operating the electronic device, in accordance with some embodiments of the present disclosure.

FIG. 8 shows a flowchart of the method 800 of operating the electronic device having the panoramic image capturing devices, in accordance with some embodiments of the present disclosure. The method 800 is merely an example, and is not intended to limit the present disclosure beyond what is explicitly recited in the claims. Additional operations can be provided before, during, and after the method 800, and some operations described can be replaced, eliminated, or moved around for additional embodiments of the method. The method 800 is briefly discussed below.

In operation 802, the angle and/or distance of the display device relative to the reference plane is sensed by the sensing unit. For example, the electronic device 200 in FIG. 2 senses the opening angle of the display device 204 relative to the base 216 by the sensing unit 208. In some embodiments, the electronic device 600 in FIG. 6 senses the distance of the display device 602 relative to the desk surface by the sensing unit 606.

In operation 804, it is determined whether the sensed angle and/or distance match a predetermined range. For example, in FIG. 2, it is determined whether the sensed opening angle of the display device 204 relative to the base 216 matches a predetermined range (e.g., larger than 30°). Further, in FIG. 6, it is determined whether the distance of the display device 602 relative to the desk surface is larger than a predetermined value.

If it matches the predetermined range, the method 800 proceeds to operation 806. In operation 806, the sensing unit produces a first signal to the drive unit. For example, when the opening angle of the display device 204 relative to the base 216 matches the predetermined range, the sensing unit 208 produces the first signal to the drive unit 210. Further, when the distance of the display device 602 relative to the desk surface is larger than a predetermined value, the sensing unit 606 produces the first signal to the drive unit 608.

In operation 808, the drive unit pushes the two panoramic image capturing devices which face different directions out of the electronic device. For example, in FIG. 2, the drive unit 210 in the electronic device 200 pushes the panoramic image capturing device 212 out of the electronic device 200 along the direction 218 and pushes the panoramic image capturing device 214 out of the electronic device 200 along the direction 220 according to the first signal.

If it does not match the predetermined range, the method 800 proceeds to operation 810. In operation 810, the sensing unit produces a second signal to the drive unit. For example, when the opening angle of the display device 204 relative to the base 216 does not match the predetermined range, the sensing unit 208 produces the second signal to the drive unit 210. Further, when the distance of the display device 602 relative to the desk surface is smaller than the predetermined value, the sensing unit 606 produces the second signal to the drive unit 608.

In operation 812, the drive unit pulls the two panoramic image capturing devices back to the electronic device. For example, the drive unit 210 pulls the panoramic image capturing device 212 back to the electronic device 200 along the direction 220 and pulls the panoramic image capturing device 214 back to the electronic device 200 along the direction 218 according to the first signal.

Some embodiments of the present disclosure provide an electronic device having the panoramic image capturing devices to sense the location of the display device relative to a reference plane by the sensing unit to make the drive unit push the panoramic image capturing devices out of the electronic device or pull the panoramic image capturing devices back to the electronic device. With the panoramic image capturing devices are pushed out of the electronic device, the viewing angle of the panoramic image capturing devices are not limited by the electronic device to allow the panoramic image capturing devices to panoramically capture images, shoot video, and make video chats. With the panoramic image capturing devices that can be pulled back to the electronic device, the panoramic image capturing devices avoid damage by collision with external objects.

The embodiments of the present disclosure offer advantages over existing art, though it should be understood that other embodiments may offer different advantages, not all advantages are necessarily discussed herein, and that no particular advantage is required for all embodiments. By utilizing the embodiments of the present disclosure the electric device can capture image, shoot video, and make video chat without additionally connecting a panoramic image capturing device.

What is claimed is:

1. An electronic device, comprising:
   a display device;
   a first panoramic image capturing device, movably configured on a display surface of the display device;
   a second panoramic image capturing device, movably configured on a back panel relative to the display surface; and
   a drive unit, configured to push the first panoramic image capturing device out of the electronic device along a first direction perpendicular to the display surface and push the second panoramic image capturing device out of the electronic device along a second direction opposite to the first direction when the drive unit receives a first signal; and pull the first panoramic image capturing device back to the electronic device along the second direction and pull the second panoramic image capturing device back to the electronic device along the first direction when the drive unit receives a second signal;
   a relay, configured to produce a pushing signal when the relay receives the first signal and to produce a pulling back signal when the relay receives the second signal; and
   a solenoid valve, having a pushing rod, wherein the pushing rod is moved along a third direction to push the first panoramic image capturing device and the second panoramic image capturing device out of the electronic device when the solenoid valve receives the pushing signal and the pushing rod is moved along a fourth direction opposite to the third direction to pull the first panoramic image capturing device and the second panoramic image capturing back to the electronic device when the solenoid valve receives the pulling back signal, wherein the third direction is parallel to the display surface.

2. The electronic device of claim 1, further comprising:
   a sensing unit, configured to sense location of the display device relative to a reference plane, wherein the sensing unit produces the first signal when the location matches a predetermined condition and produces the second signal when the location does not match the predetermined condition.

3. The electronic device of claim 2, wherein the reference plane is a base surface of the electronic device, and the sensing unit comprises:

an angle sensor, configured to sense an opening angle of the display device relative to the reference plane, wherein the first signal is produced when the opening angle is over a predetermined range and the second signal is produced when the opening angle is within the predetermined range.

4. The electronic device of claim 2, wherein the reference plane is a surface of an external object, and the sensing unit comprises:

a distance sensor, configured to sense a distance of the electronic device relative to the reference plane, wherein the first signal is produced when the distance is over a predetermined range and the second signal is produced when the distance is within the predetermined range.

5. A method of operating an electronic device, comprising:

sensing an angle and/or distance of a display device relative to a reference plane, wherein the display device has a display surface; and producing a pushing signal by a relay of a drive unit when the angle and/or distance is over a predetermined range;

producing a pulling back signal by the relay when the angle and/or distance is within the predetermined range;

moving a pushing rod of a solenoid valve of the drive unit along a third direction to push a first panoramic image capturing device out of the electronic device along a first direction perpendicular to the display surface and push a second panoramic image capturing device out of the electronic device along a second direction opposite to the first direction when the solenoid valve receives the pushing signal; and moving the pushing rod along a fourth direction opposite to the third direction to pull the first panoramic image capturing device back to the electronic device along the second direction and pull the second panoramic image capturing device back to the electronic device along the first direction when the solenoid valve receives the pulling back signal, wherein the third direction is parallel to the display surface.

6. The method of claim 5, wherein the first direction and the second direction are perpendicular to a display surface of the display device.

* * * * *